(12) United States Patent
Yun et al.

(10) Patent No.: US 11,888,508 B2
(45) Date of Patent: Jan. 30, 2024

(54) SIGNAL PROCESSING CIRCUIT AND ELECTRONIC DEVICE COMPRISING SAME

(71) Applicant: Samsung Electronics Co., Ltd., Gyeonggi-do (KR)

(72) Inventors: Himchan Yun, Gyeonggi-do (KR); Kyungjae Lee, Gyeonggi-do (KR); Soonho Hwang, Gyeonggi-do (KR)

(73) Assignee: Electronics Co., Ltd

( * ) Notice: Subject to any disclaimer, the term of this patent is extended or adjusted under 35 U.S.C. 154(b) by 18 days.

(21) Appl. No.: 17/432,367

(22) PCT Filed: Feb. 18, 2020

(86) PCT No.: PCT/KR2020/002292
§ 371 (c)(1),
(2) Date: Aug. 19, 2021

(87) PCT Pub. No.: WO2020/171528
PCT Pub. Date: Aug. 27, 2020

(65) Prior Publication Data
US 2023/0136852 A1    May 4, 2023

(30) Foreign Application Priority Data
Feb. 19, 2019    (KR) .................. 10-2019-0019507

(51) Int. Cl.
*H04B 1/10*    (2006.01)
*H04B 1/16*    (2006.01)
*H04B 1/18*    (2006.01)
*H03H 7/38*    (2006.01)
(Continued)

(52) U.S. Cl.
CPC ............. *H04B 1/40* (2013.01); *H04B 1/3827* (2013.01)

(58) Field of Classification Search
None
See application file for complete search history.

(56) References Cited

U.S. PATENT DOCUMENTS

| | | | |
|---|---|---|---|
| 8,432,234 B2 * | 4/2013 | Manssen | H01Q 21/28 455/73 |
| 9,054,756 B2 | 6/2015 | See et al. | |
| 9,130,262 B2 | 9/2015 | Park et al. | |

(Continued)

FOREIGN PATENT DOCUMENTS

| | | |
|---|---|---|
| KR | 1020110037223 | 4/2011 |
| KR | 10-1133629 | 4/2012 |

(Continued)

OTHER PUBLICATIONS

International Search Report dated Jun. 15, 2020 issued in counterpart application No. PCT/KR2020/002292, 5 pages.
(Continued)

*Primary Examiner* — Pablo N Tran
(74) *Attorney, Agent, or Firm* — The Farrell Law Firm, P.C.

(57) ABSTRACT

Disclosed is an electronic device including a wireless communication module that transmits or receives a signal, a feed line that delivers a signal between the wireless communication module and a radiator, a tuner including a variable capacitor connected to a ground part, and a reactance element connected between the variable capacitor and the feed line.

15 Claims, 17 Drawing Sheets

(51) Int. Cl.
   *H04B 1/40*   (2015.01)
   *H04B 1/3827*   (2015.01)

(56) References Cited

U.S. PATENT DOCUMENTS

| | | | | |
|---|---|---|---|---|
| 9,813,532 | B2* | 11/2017 | Kim | H01Q 5/335 |
| 10,826,160 | B2 | 11/2020 | Kwak et al. | |
| 10,855,320 | B2* | 12/2020 | Filipovic | H04B 1/18 |
| 11,095,021 | B2 | 8/2021 | Sung et al. | |
| 2004/0041734 | A1* | 3/2004 | Shiotsu | H01Q 9/42 |
| | | | | 343/702 |
| 2008/0055016 | A1* | 3/2008 | Morris | H03H 7/38 |
| | | | | 333/32 |
| 2013/0069737 | A1 | 3/2013 | See et al. | |
| 2013/0088405 | A1 | 4/2013 | Lee et al. | |
| 2016/0064832 | A1 | 3/2016 | Shin et al. | |
| 2017/0019137 | A1 | 1/2017 | Parkhurst et al. | |
| 2018/0034135 | A1 | 2/2018 | Kwak et al. | |
| 2018/0062249 | A1 | 3/2018 | Sung et al. | |
| 2021/0051599 | A1* | 2/2021 | Cha | H04B 17/318 |
| 2021/0344106 | A1 | 11/2021 | Sung et al. | |

FOREIGN PATENT DOCUMENTS

| | | |
|---|---|---|
| KR | 10-2014-0000814 | 1/2014 |
| KR | 1020140067142 | 6/2014 |
| KR | 10-2015-0002347 | 1/2015 |
| KR | 1020160024631 | 3/2016 |
| KR | 1020160035903 | 4/2016 |
| KR | 10-2018-0010957 | 1/2018 |
| KR | 1020180024336 | 3/2018 |

OTHER PUBLICATIONS

Written Opinion dated Jun. 15, 2020 issued in counterpart application No. PCT/KR2020/002292, 5 pages.
European Search Report dated Feb. 9, 2022 issued in counterpart application No. 20760307.7-1216, 8 pages.
Korean Office Action dated May 22, 2023 issued in counterpart application No. 10-2019-0019507, 13 pages.
Korean Office Action dated Nov. 9, 2023 issued in counterpart application No. 10-2019-0019507, 9 pages.

\* cited by examiner

SIGNAL PROCESSING CIRCUIT AND ELECTRONIC DEVICE COMPRISING SAME

CROSS-REFERENCE TO RELATED APPLICATION(S)

This application is a National Phase Entry of PCT International Application No. PCMKR2020/002292, which was filed on Feb. 18, 2020, and claims priority under 35 U.S.C. § 119 to Korean Patent Application No. 10-2019-0019507, which was filed on Feb. 19, 2019, in the Korean intellectual Property Office, the entire contents of each of which is incorporated herein by reference.

BACKGROUND

1. Field

The disclosure relates generally to an electronic device, and more particularly, to a signal processing circuit of the electronic device and a method for transmitting or receiving a signal by using the signal processing circuit.

Description of Related Art

An electronic device typically includes a signal processing circuit for transmitting or receiving a signal by using a radiator. For example, a communication module that performs wireless communication by using an antenna is typically disposed in the electronic device.

There is a need for miniaturization of circuits included in an electronic device, to support multi-band or multi-mode services or to provide a thinner and more compact identifier (ID).

When at least part of a human body, such as a head or hand, accesses or contacts an electronic device such as a smartphone or tablet, a radiator may have reduced system efficiency which, in turn, reduces the performance of the electronic device.

A variable capacitor may be used to compensate for an efficiency loss that occurs in various environments. When the variable capacitor is used to compensate for the efficiency loss, there is a frequent need for a large capacitance. However, a capacitance range of the variable capacitor used in a circuit may be limited. When the low-band resonant frequency band is incapable of being obtained although the maximum value of the capacitance of the variable capacitor is used, performance tends to degrade.

As such, there is a need in the art for improved radiating performance of a radiator in an electronic device.

SUMMARY

Aspects of the disclosure are to address at least the above-mentioned problems and/or disadvantages and to provide at least the advantages described below.

Accordingly, an aspect of the disclosure is to provide an electronic device in which the radiating performance of a radiator is improved in various radiating environments, such as where a hand phantom is holding an electronic device or the user's head is close to the electronic device, by shifting a resonance frequency to a lower band through the amplification of a variable capacitor. Another aspect of the disclosure is to provide a circuit or electronic device including a tuner, in which a value greater than the maximum capacitance value of a variable capacitor provided by the tuner may be used.

In accordance with an aspect of the disclosure, an electronic device may include a wireless communication module that transmits or receives a signal, a feed line that delivers a signal between the wireless communication module and a first radiator, a tuner including a variable capacitor connected to a ground part, and a reactance element connected between the variable capacitor and the feed line. The tuner may include a first switch that allows the reactance element and the variable capacitor to be selectively connected in series with each other.

In accordance with an aspect of the disclosure, a signal processing circuit may include a feed line that delivers a signal between a wireless communication module and a first radiator, a variable capacitor and a reactance element that are connected between the feed line and a ground part and are connected in series with each other, and a first switch connected to opposite ends of the reactance element.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Embodiments of the disclosure will be described with reference to the accompanying drawings. Accordingly, those of ordinary skill in the art will recognize that modifications, equivalents, and/or alternatives on the embodiments described herein can be variously made without departing from the scope and spirit of the disclosure. Description of known functions and/or configurations will be omitted for the sake of clarity and conciseness.

Figure 1:
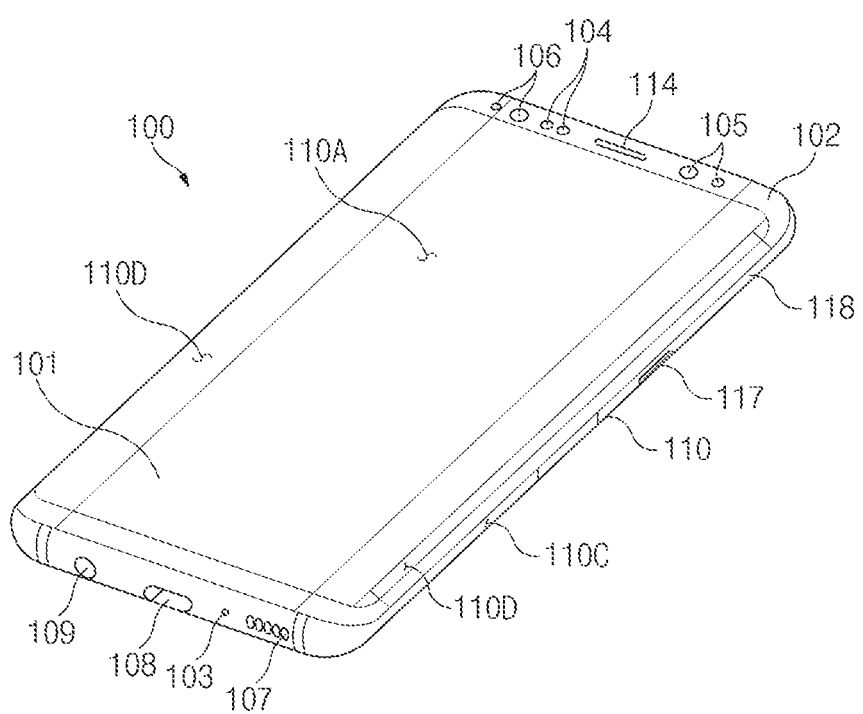
FIG. 1 illustrates a front surface of a mobile electronic device, according to an embodiment.
Figure 2:
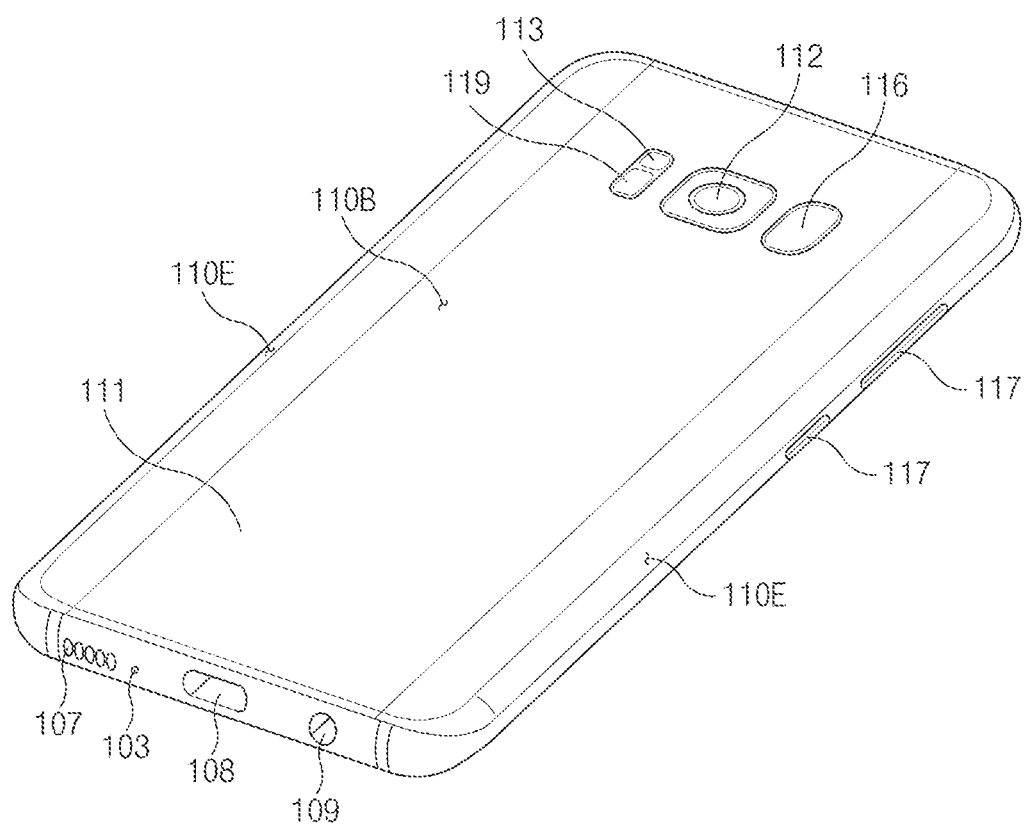
FIG. 2 illustrates a rear surface of an electronic device of FIG. 1.

Referring to FIGS. 1 and 2, according to an embodiment, the electronic device 100 may include a housing 110 including a first surface 110A. (or front surface), a second surface 110B (or rear surface), and a side surface 110C surrounding the space between the first surface 110A and the second surface 110B. The housing may be referred to as the structure forming some of the first surface 110A, the second surface 110B, and the side surface 110C of FIG. 1. According to an embodiment, the first surface 110A may include a front plate 102 (e.g., a glass plate or a polymer plate including various coating layers) having at least a portion substantially transparent. The second surface 10B may include a rear plate 111 substantially opaque. The rear plate 111 may include, for example, coated or colored glass, ceramic, polymer, metal (e.g., aluminum, stainless steel (STS), or magnesium) or the combination of the above materials. The side surface 110O may include a side bezel structure (or "side member") 118 which is coupled to the front plate 102 and the rear plate 111, and includes metal and/or polymer. According to an embodiment, the rear plate 111 and the side bezel structure 118 may be formed integrally with each other and may include the same material (e.g., a metal material such as aluminum).

According to an embodiment illustrated, the front plate 102 may include two first areas 110D bent toward the rear plate 111 from the first surface 110A while seamlessly extending and formed at opposite long edge ends of the front plate 102. According to an embodiment illustrated in FIG. 2, the rear plate 111 may include two second areas 110E bent from the second surface 110B toward the front plate 102 while seamlessly extending and formed at opposite long edge ends of the rear plate 111. According to an embodiment, the front plate 102 (or the rear plate 111) may include only one of the first areas 110D (or the second areas 110E), According to another embodiment, some of the first areas 110D or the second areas 110E may not be included. According to the embodiments, when viewed from the side surface of the electronic device 100, the side bezel structure 118 may have a first thickness (or width) at the side surface having no first areas 110D or second areas 110E, and may have a second thickness thinner than the first thickness, at the side surface including the first areas 110D or the second areas 110E.

According to an embodiment, the electronic device 100 includes at least one a display 101, audio modules 103, 107 and 114, sensor modules 104, 116 and 119, camera modules 105, 112 and 113, a key input device 117, a light emitting device 106, or connector holes 108 and 109. According to an embodiment, the electronic device 100 may omit at least one (e.g., the key input device 117 or the light emitting device 106) of components or may include other components.

The display 101 may be exposed, for example, through a substantial portion of the front plate 102. According to an embodiment, at least a portion of the display 101 may be exposed through the front plate 102 including the first surface 110A and first areas 110D of the side surface 110O. According to an embodiment, the edge of the display 101 may be formed substantially identically to the shape of an adjacent outer shape of the front plate 102. Alternatively, to expand an area for exposing the display 101, the distance between an outer portion of the display 101 and an outer portion of the front plate 102 may be substantially uniformly formed.

A recess or an opening is formed in a portion of a screen display area of the display 101. In addition, at least one of the audio module 114, the sensor module 104, the camera module 105, or the light emitting device 106 aligned in line with the recess or the opening may be included in the portion of the screen display area of the display 101. The display 101 may be coupled or disposed adjacent to a touch sensing circuit, a pressure sensor to measure the intensity (pressure) of a touch, and/or a digitizer to detect the stylus pen based on an electromagnetic scheme. According to an embodiment, at least some of the sensor module 104 or 119 and/or at least a portion of the key input device 117 may be disposed in the first areas 110D and/or the second areas 110E.

The audio modules 103, 107, and 114 may include a microphone hole 203 and speaker holes 107 and 114. The microphone hole 103 may have a microphone disposed inside the microphone hole 103 to obtain an external sound. In an embodiment, a plurality of microphones may be provided to sense the direction of a sound. The speaker holes 107 and 114 may include an external speaker hole 107 and a receiver hole 114 for conversation. In an embodiment, the speaker holes 107 and 114 and the microphone hole 103 may be implemented into one hole or a speaker may be included without the speaker holes 107 and 114 (e.g., a piezoelectric speaker).

The sensor modules 104, 116, and 119 may sense electrical signals or data values corresponding to an internal operating state or an external environment state of the electronic device 100. The sensor modules 104, 116 and 119 may, for example, include a first sensor module 104 (e.g., a proximity sensor) and/or a second sensor module (e.g., a proximity sensor) disposed on the first side surface 110A of the housing 110, and/or a third sensor module 119 (e.g., a heart rate monitor (HRM) sensor) and/or a fourth sensor module 116 disposed on the second surface 110B of the housing 110. The fingerprint sensor may be disposed on the second surface 110B as well as the first surface 110A (e.g., the display 101) of the housing 210. The electronic device 100 may further include a sensor module, for example, include at least one of a gesture sensor, a gyro sensor, an air pressure sensor, a magnetic sensor, an acceleration sensor, a grip sensor, a color sensor, an infrared sensor, a biometrics sensor, a temperature sensor, a humidity sensor, or an illuminance sensor 104.

The camera modules 105, 112 and 113 may include a first camera device 105 disposed on the first side surface 110A of the electronic device 100 and a second camera device 112 and/or a flash 113 disposed on the second side surface 110B of the electronic device 100. The camera devices 105 and 112 may include one or a plurality of lenses, an image sensor, and/or an image signal processor. The flash 113 may include, for example, a light emitting diode or a xenon lamp.

According to an embodiment, two or more lenses (infrared camera, a wide angle lens, and a telephoto lens) and image sensors may be disposed on one surface of the electronic device 100.

The key input device 117 may be disposed on the side surface 110C of the housing 110. According to another embodiment, the electronic device 100 may not include some or an entire portion of the key input device 117 and the some or the entire portion of the key input device 117 not included may be implemented in another form such as a soft key on the display 101. According to another embodiment, the key input device 117 may include the sensor module 116 disposed on the second side surface 110B of the housing 110.

The light emitting device 106 may be, for example, disposed on the first surface 110A of the housing 110. The light emitting device 106 may provide, for example, the state information of the electronic device 100 in an optical form. According to another embodiment, the light emitting device 106 may provide, for example, a light source operating together with the operation of the camera module 105. The light emitting device 106 may include, for example, an LED, an IR LED, and a xenon lamp.

The connector holes 108 and 109 may include a first connector hole 108 to receive a connector (e.g., a USB connector) to transmit or receive power and/or data together with the external electronic device and a second connector hole (e.g., an ear-phone jack) 109 to receive a connector to transmit or receive an audio signal together with the external electronic device.

Figure 3:
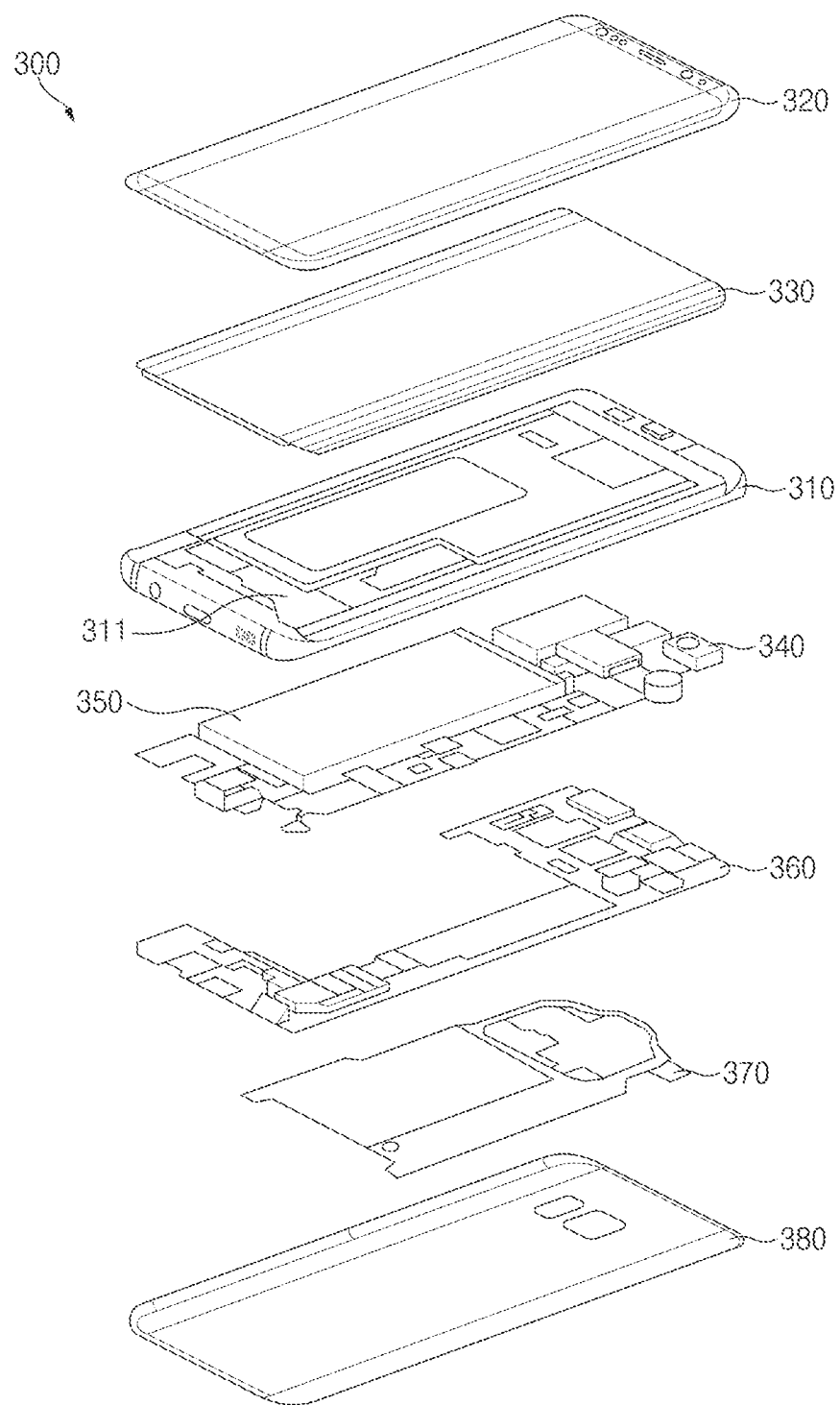
FIG. 3 is a perspective view of an electronic device of FIG. 1.

Referring to FIG. 3, an electronic device may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. According to an embodiment, the electronic device 300 may additionally include at least one (e.g., the first support member 311 or the second support member 360) of components At least one of components of the electronic device 300 may be identical to or similar to at least one of components of the electronic device 200 of FIG. 2 or FIG. 3, and duplicated descriptions thereof will be omitted.

The first support member 311 is disposed in the electronic device 101 to be coupled to the side bezel structure 310 or to be integrated with the side bezel structure 310. The first support member 311 may include, for example, a metal material and/or a non-metal material (e.g., polymer). The first support member 311 may have one surface coupled to the display 330 and an opposite surface coupled to the printed circuit board 340. A processor, a memory, and/or an interface may be mounted on the printed circuit board 340. The processor may include, for example, one or more of a central processing unit, an application processor, a graphic processing unit, an image signal processor, a sensor hub processor, or a communication processor.

The memory may include, for example, a volatile memory and/or a non-volatile memory. The interface may include, for example, a high definition multimedia interface (HDMI), a universal serial bus (USB) interface, a secure digital (SD) card interface, and/or an audio interface. The interface may, for example, electrically or physically connect the electronic device 300 with the external electronic device and may include a USB connector, an SD card/MMC connector, or an audio connector.

The battery 350 may include a device to supply power to at least one component of the electronic device 300, for example, a non-rechargeable primary battery, or a rechargeable secondary battery, or a fuel cell. At least a portion of the battery 350 may be on the substantially same plane as a plane of the printed circuit board 340. The battery 350 may be disposed inside the electronic device 300 integrally with the electronic device 300, and may be disposed detachably from the electronic device 101.

The antenna 370 may be interposed between the rear plate 380 and the battery 350. The antenna 370 may include, for example, a near field communication (NFC) antenna, a wireless charging antenna, and/or a magnetic secure transmission (MST) antenna. The antenna 370 may make local area network communication with an external device or may wirelessly transmit or receive power necessary for charging. According to another embodiment, an antenna structure may be formed by a portion of the side bezel structure 310 and/or the first support member 311 or the combination of the side bezel structure 140 and the first support member 141.

Figure 4:
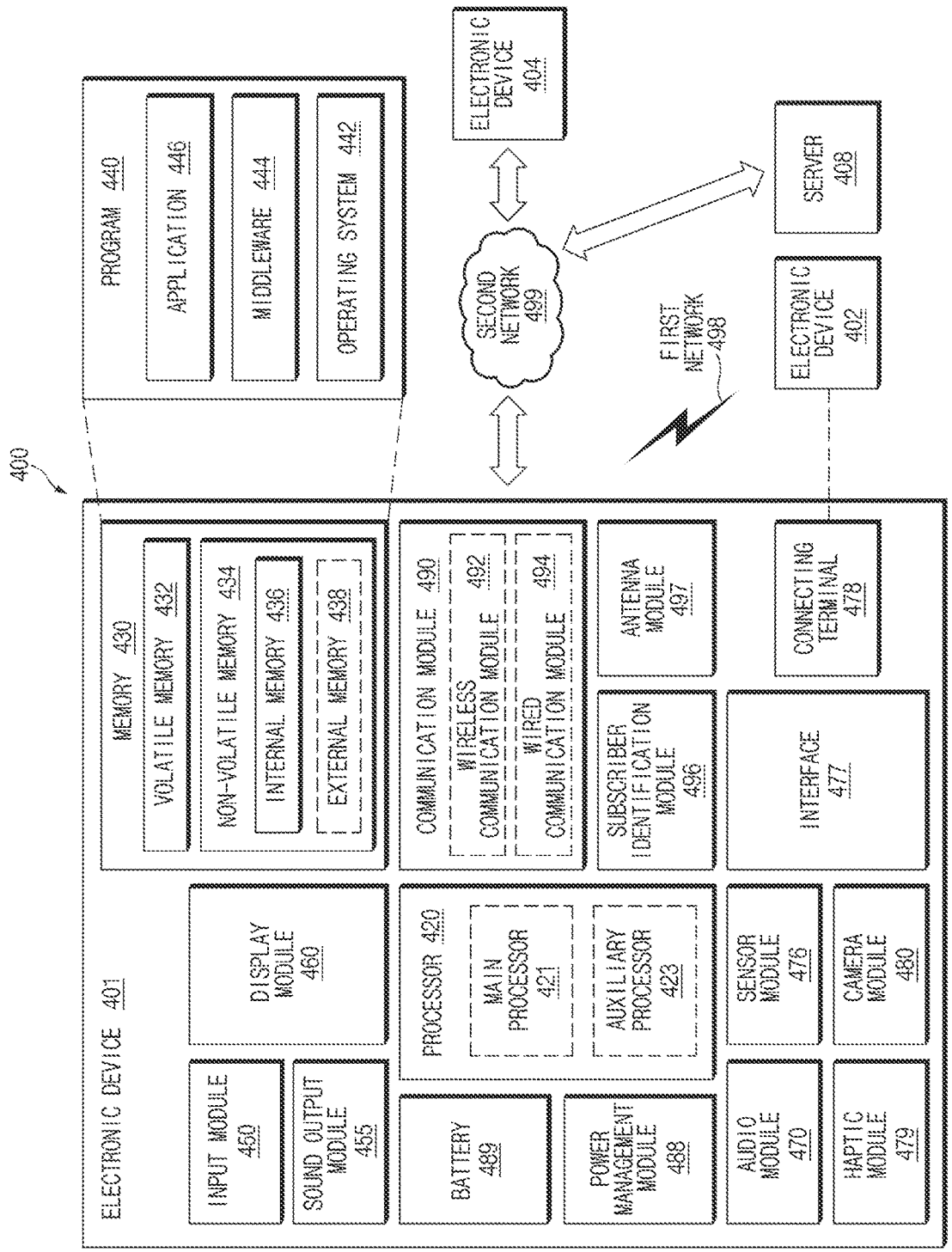
FIG. 4 is a block diagram illustrating an electronic device in a network environment according to an embodiment.

FIG. 4 is a block diagram illustrating an electronic device 401 in a network environment 400 according to an embodiment. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application), According to an embodiment, the auxiliary processor 423 (e.g., an image signal processor or a. communication processor) may be implemented as part of another component (e.g., the camera module 480 or the communication module 490) functionally related to the auxiliary processor 423.

The memory 430 may store various data used by at least one component e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by another component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state, According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, an HDMI, a USB interface, an SD card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation, According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information international mobile subscriber identity (IMSI)) stored in the SIM 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

Figure 5:
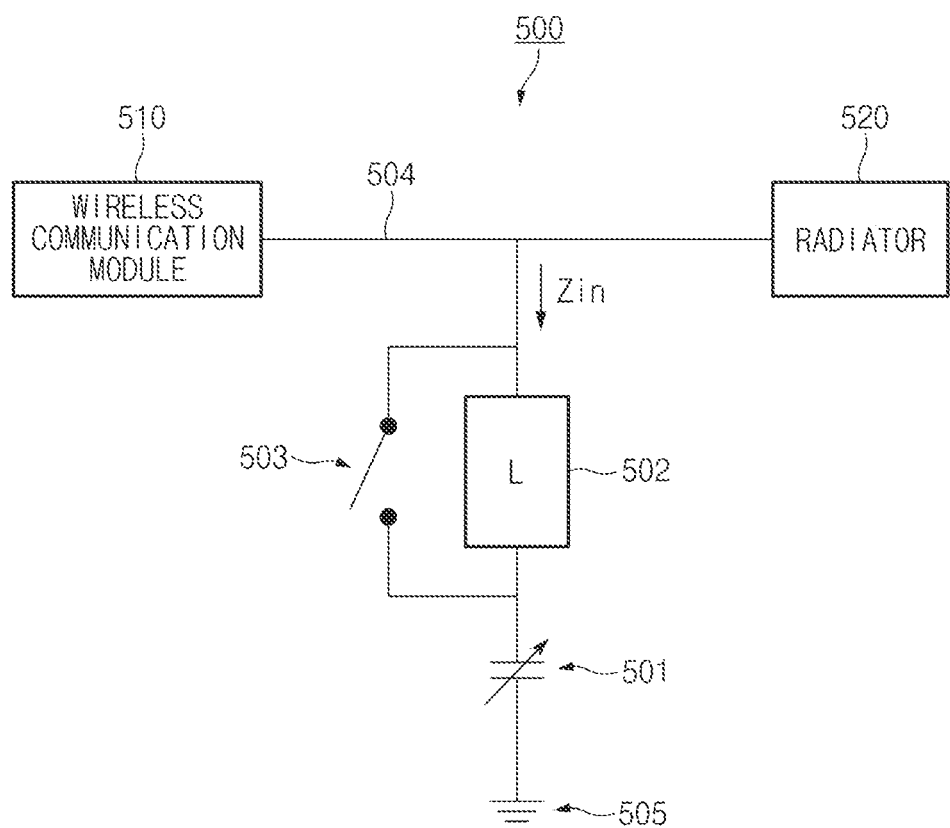
FIG. 5 is a circuit diagram illustrating a main configuration of a signal processing circuit, according to an embodiment.

FIG. 5 is a circuit diagram 500 illustrating a main configuration of a signal processing circuit, according to an embodiment.

A signal processing circuit may include a variable capacitor 501 and a reactance element 502 that are connected in series. Referring to FIG. 5, the variable capacitor 501 and the reactance element 502 may be connected between a ground part 505 and a feed line 504, which transmits and receives a signal from a wireless communication module 510 to a radiator 520. The signal delivered through the feed line may be an electrical signal or a radio frequency (RF) signal.

FIG. 5 illustrates that the variable capacitor 501 is connected to the ground part 505. However, connection locations of the variable capacitor 501 and the reactance element 502 may be substituted with each other.

The signal processing circuit may further include a first switch 503 connected to opposite ends of the reactance element 502. When the first switch 503 is closed, the opposite ends of the first switch 503 are connected substantially without resistance. In this specification, a state in which the opposite ends of the switch are connected substantially without resistance refers to as a state in which a switch is turned on. The opposite ends of the reactance element 502 connected in parallel with the first switch 503 are connected substantially without resistance when the first switch 503 is turned on. Accordingly, the reactance element 502 may not affect impedance Zin seen from the feed line 504.

When the first switch 503 is opened, the opposite ends of the first switch 503 are disconnected from each other. In this specification, a state in which the switch is opened refers to as a state in which a switch is turned off. When the first switch 503 is turned off, the reactance element 502 may affect impedance Zin seen from the feed line 504. For example, the signal processing circuit may operate in a mode that is different depending on an operation of the first switch 503.

Figure 6:
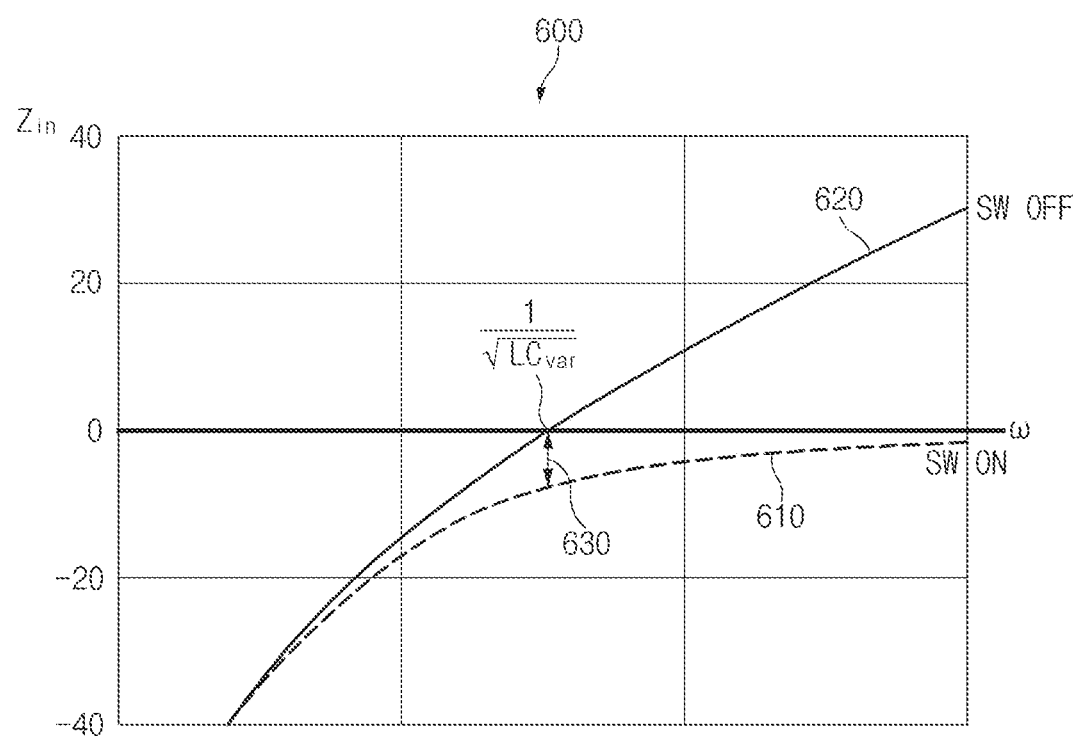
FIG. 6 illustrates a graph illustrating amplification of capacitance, according to an embodiment.

FIG. 6 is a graph 600 illustrating amplification of capacitance, according to an embodiment. FIG. 6 illustrates impedance Zin according to frequency ω.

Referring to a curve 610 indicating that the first switch 503 of FIG. 5 is turned on, impedance Zin consists of only a capacitance component, and thus impedance Zin converges to zero as frequency ω increases. Accordingly, impedance Zin may not be substantially zero.

On the other hand, referring to a curve 620 indicating that the first switch 503 of FIG. 5 is turned off, impedance Zin becomes 0 at a resonance frequency $$\frac{1}{\sqrt{LC_{var}}}$$

as shown in Equation (1) as follows.

$$Z_{in} = j\omega L + \frac{1}{j\omega C_{var}} = \frac{1}{j\omega\left(\frac{1}{1-\omega^2 LC_{var}}\right)} = \frac{1}{j\omega C_{\mathit{eff}}} \quad \text{for } 0\langle\omega\langle\frac{1}{\sqrt{LC_{var}}} \quad (1)$$

$$= 0 \quad \text{for } \omega = \frac{1}{\sqrt{LC_{var}}}$$

$$= j\omega\left(L - \frac{1}{\omega^2 C_{var}}\right) = j\omega L_{\mathit{eff}} \quad \text{for } \omega\rangle\frac{1}{\sqrt{LC_{var}}}$$

In Equation (1), L denotes a reactance value of a reactance element, $C_{var}$ denotes a capacitance value of a variable capacitor, and ω denotes a frequency.

Accordingly, when the signal processing circuit of FIG. 5 operates while the first switch 503 of FIG. 5 is turned off, an effect in which impedance Zin is amplified by a difference 630 between the curve 610 and the curve 620 may be obtained at frequency $$\frac{1}{\sqrt{LC_{var}}}.$$

Figure 7:
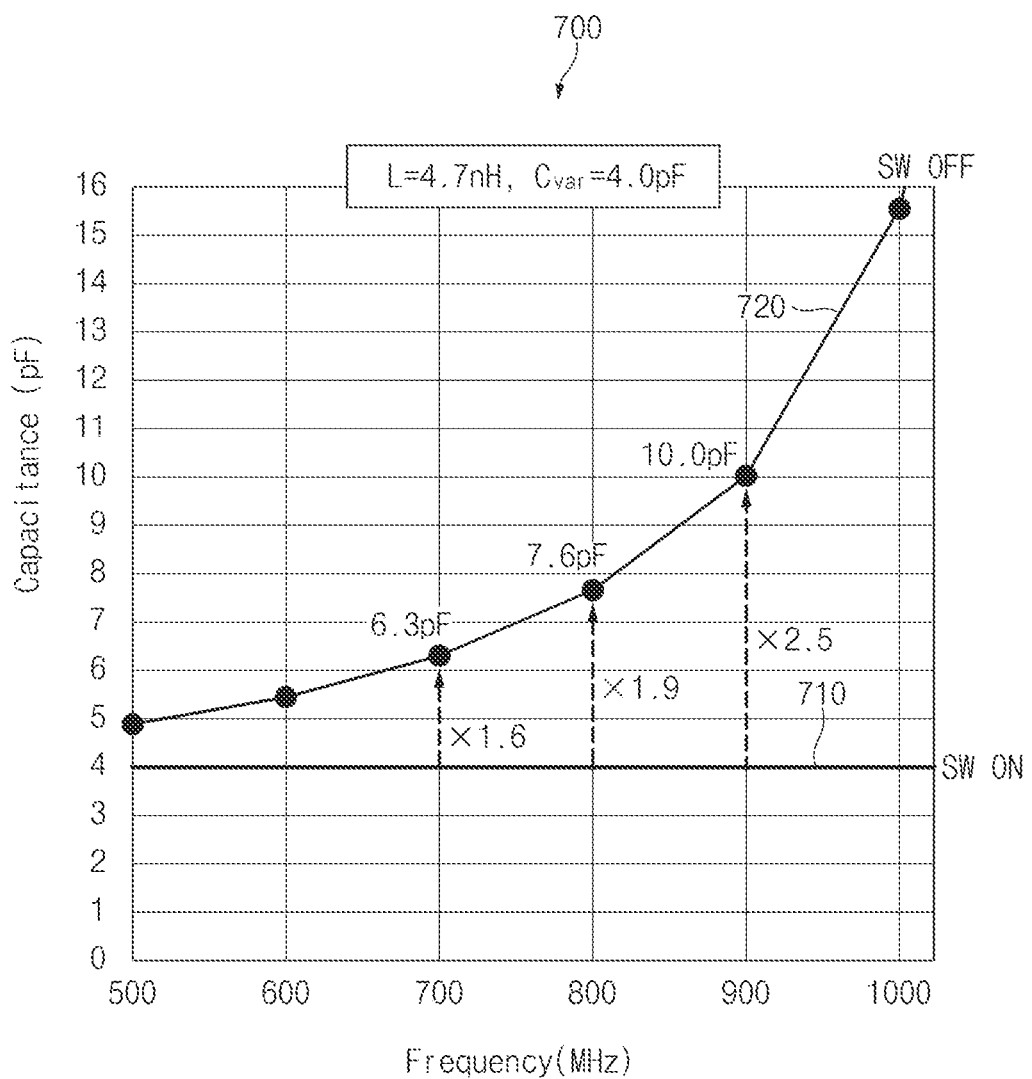
FIG. 7 is a graph illustrating capacitance amplified depending on a frequency in a signal processing circuit, according to an embodiment.

FIG. 7 is a graph 700 illustrating capacitance amplified depending on a frequency in a signal processing circuit, according to an embodiment.

For example, FIG. 7 illustrates capacitance in picofarads (pF) in relation to frequency megahertz (MHz) and shows a capacitance value 710 when the first switch 503 of FIG. 5 is turned on and a capacitance value 720 when the first switch 503 of FIG. 5 is turned off, when a reactance element of a reactance value of 4.7 nH is used and the capacitance value of a variable capacitor is 4 pF.

Referring to FIG. 7, the reactance of the reactance element does not affect a circuit when the first switch 503 of FIG. 5 is turned on, and thus the capacitance is maintained at 4 pF. On the other hand, when the first switch 503 of FIG. 5 is turned off, the capacitance value 720 increases as a frequency increases.

Figure 8:
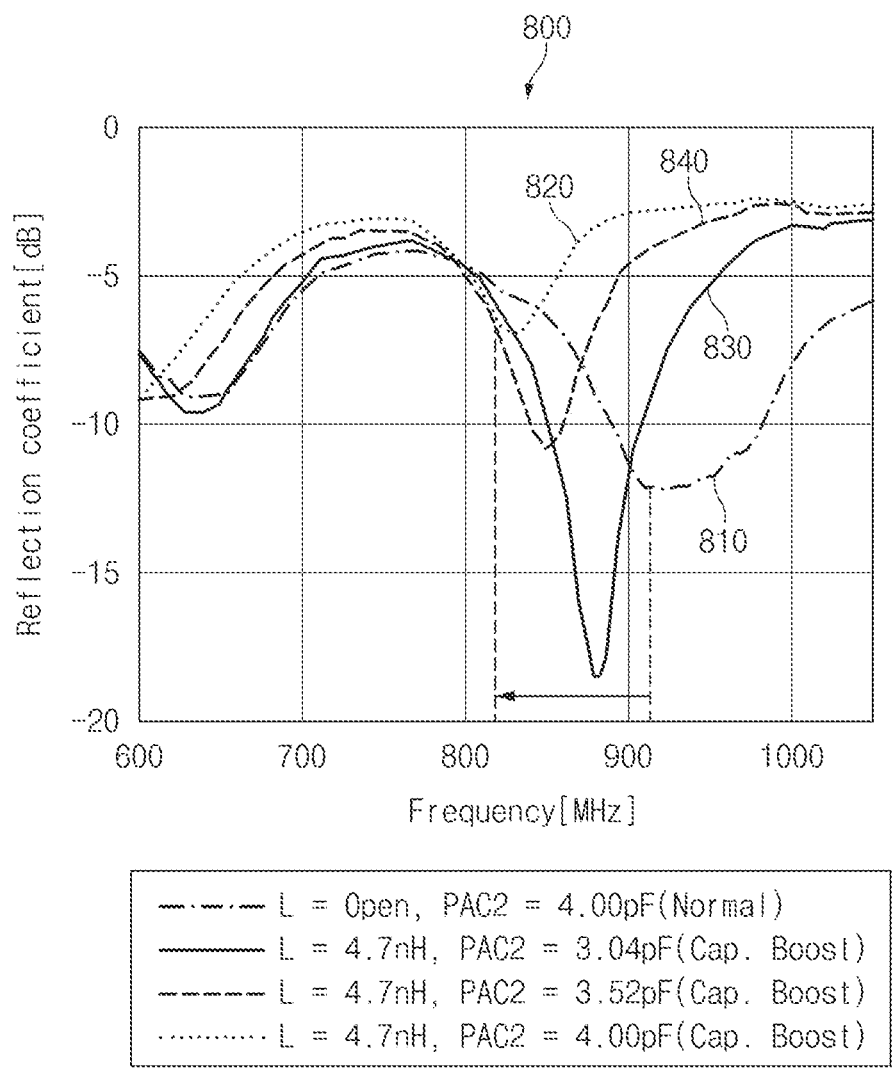
FIG. 8 is a graph illustrating an experimental result regarding a shift of a resonant frequency in a signal processing circuit, according to an embodiment.

FIG. 8 is a graph 800 illustrating an experimental result regarding a shift of a resonant frequency in a signal processing circuit, according to an embodiment.

Referring to FIG. 8, the graph 800 illustrates reflection coefficient in decibels (dB) in relation to frequency (MHz). As compared to curve 810 where the capacitance of a variable capacitor is 4 pF and a reactance element is not connected ("open"), it may be identified that a resonance frequency is shifted to a lower band in curve 820 where the reactance element is connected. Accordingly, a low-band antenna may be easily implemented by using a signal processing circuit. Furthermore, referring to a reflection coefficient in curve 830 where the capacitance is 3.04 pF and a reflection coefficient in curve 840 where the capacitance is 3.52 pF, it is identified that the resonant frequency is shifted to a high band as the capacitance decreases.

Figure 9:
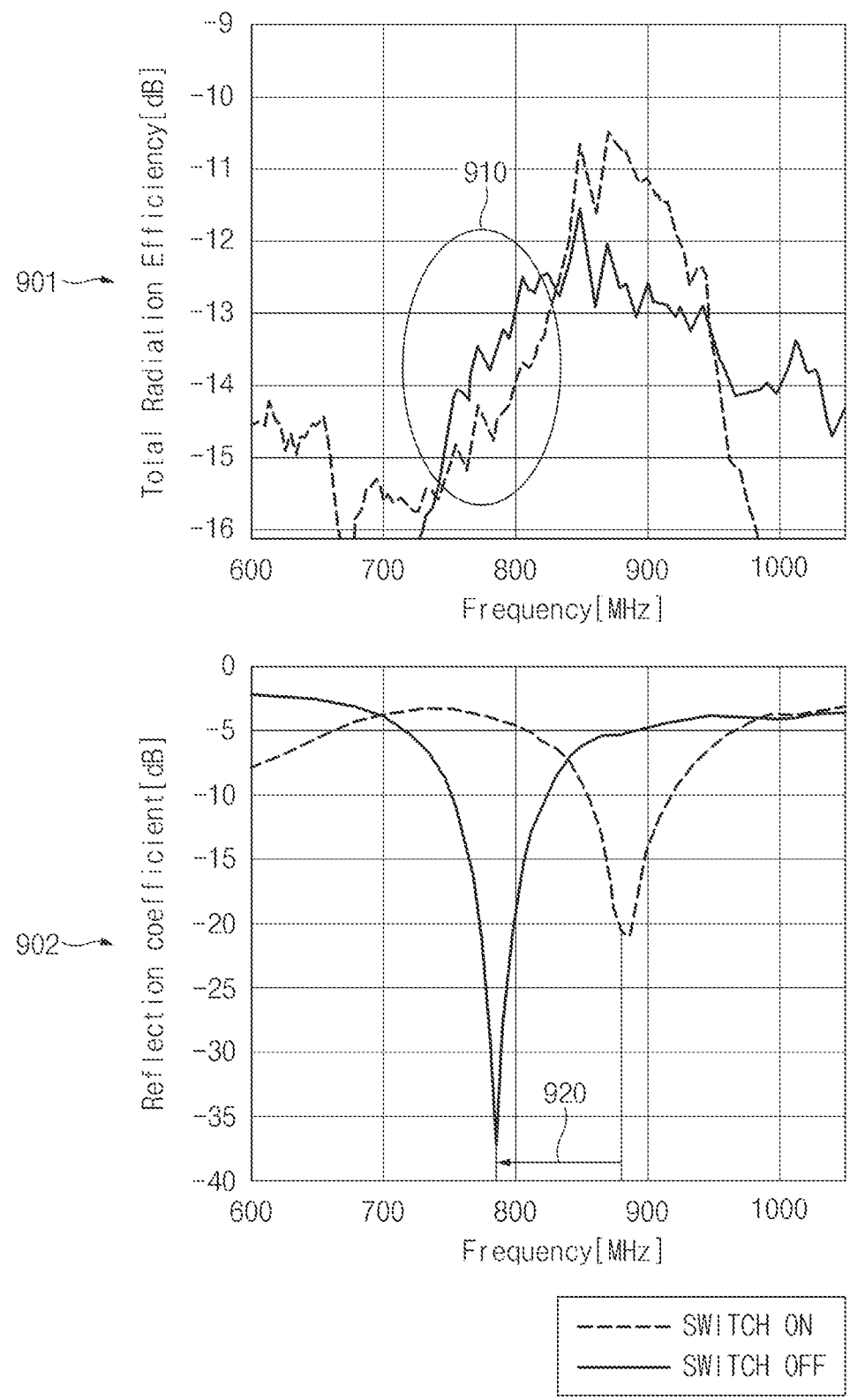
FIG. 9 illustrates a graph of radiation efficiency and a graph of a reflection coefficient according to a state of a switch of a signal processing circuit, according to an embodiment.

FIG. 9 illustrates a graph 901 of radiation efficiency and a graph 902 of a reflection coefficient according to a state of a switch of a signal processing circuit, according to an embodiment.

Graph 901 illustrates total radiation efficiency (dB) in relation to frequency MHz) and indicates that the radiation efficiency when the signal processing circuit operates while the first switch 503 of FIG. 5 is turned off is higher in a partial region 910 than the radiation efficiency when a signal processing circuit operates while the first switch 503 of FIG. 5 is turned on.

Graph 902 illustrates a reflection coefficient (dB) in relation to frequency (MHz). A shift 920 of the resonance frequency to a lower band occurs when the first switch 503 of FIG. 5 is changed from an on state to an off state.

Figure 10:
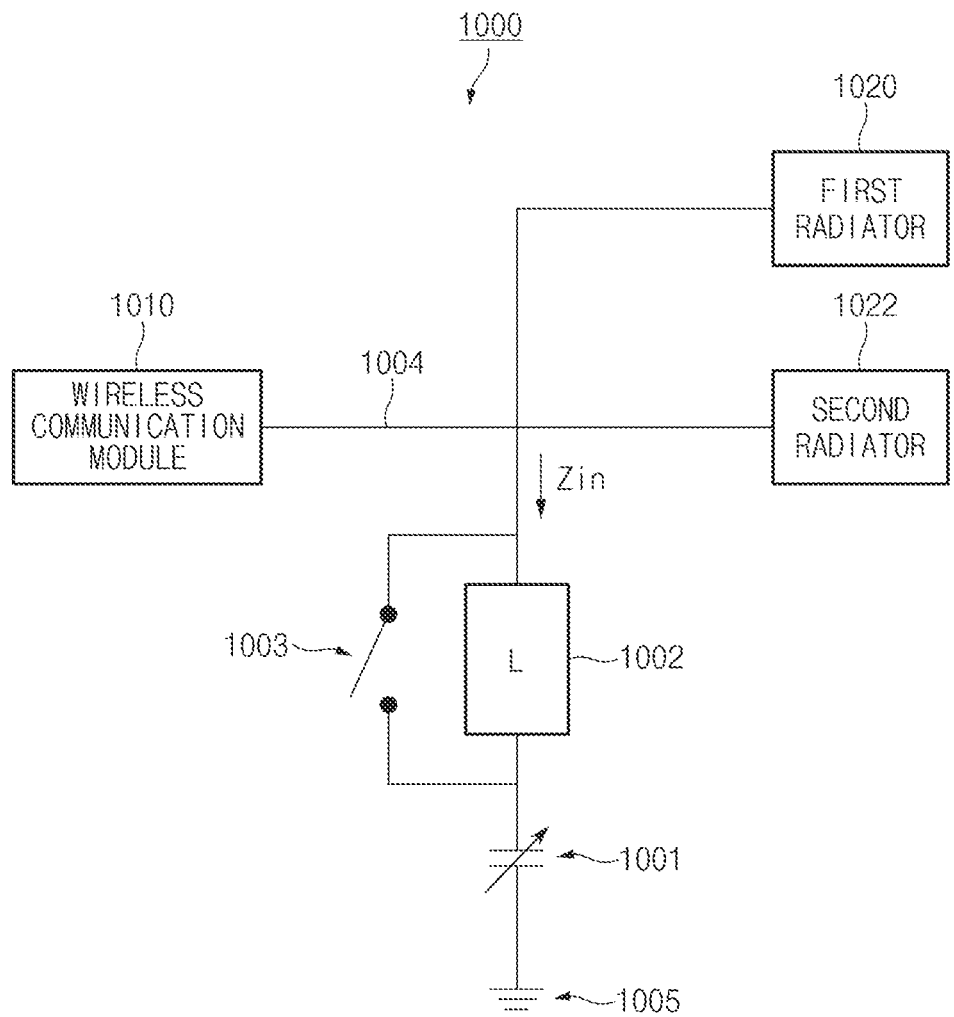
FIG. 10 is a circuit diagram illustrating a main configuration of a signal processing circuit including a plurality of radiators, according to an embodiment.

FIG. 10 is a circuit diagram 1000 illustrating a main configuration of a signal processing circuit including a plurality of radiators, according to an embodiment.

A signal processing circuit may include a variable capacitor 1001 and a reactance element (L) 1002, which are connected in series with each other, or a switch 1003 connected to opposite ends of the reactance element (L) 1002. The capacitor 1001 and the reactance element (L) 1002 may be connected between a feed line 1004, which delivers a signal from a wireless communication module 1010 to a first radiator 1020, and a ground part 1005. A signal processing circuit may further include a second radiator 1022 that is another radiator for transmitting or receiving signals in different frequency bands. As compared with the circuit configuration of FIG. 5, the wireless communication module 1010 may process signals in different bands when the second radiator 1022 is further connected.

Figure 11:
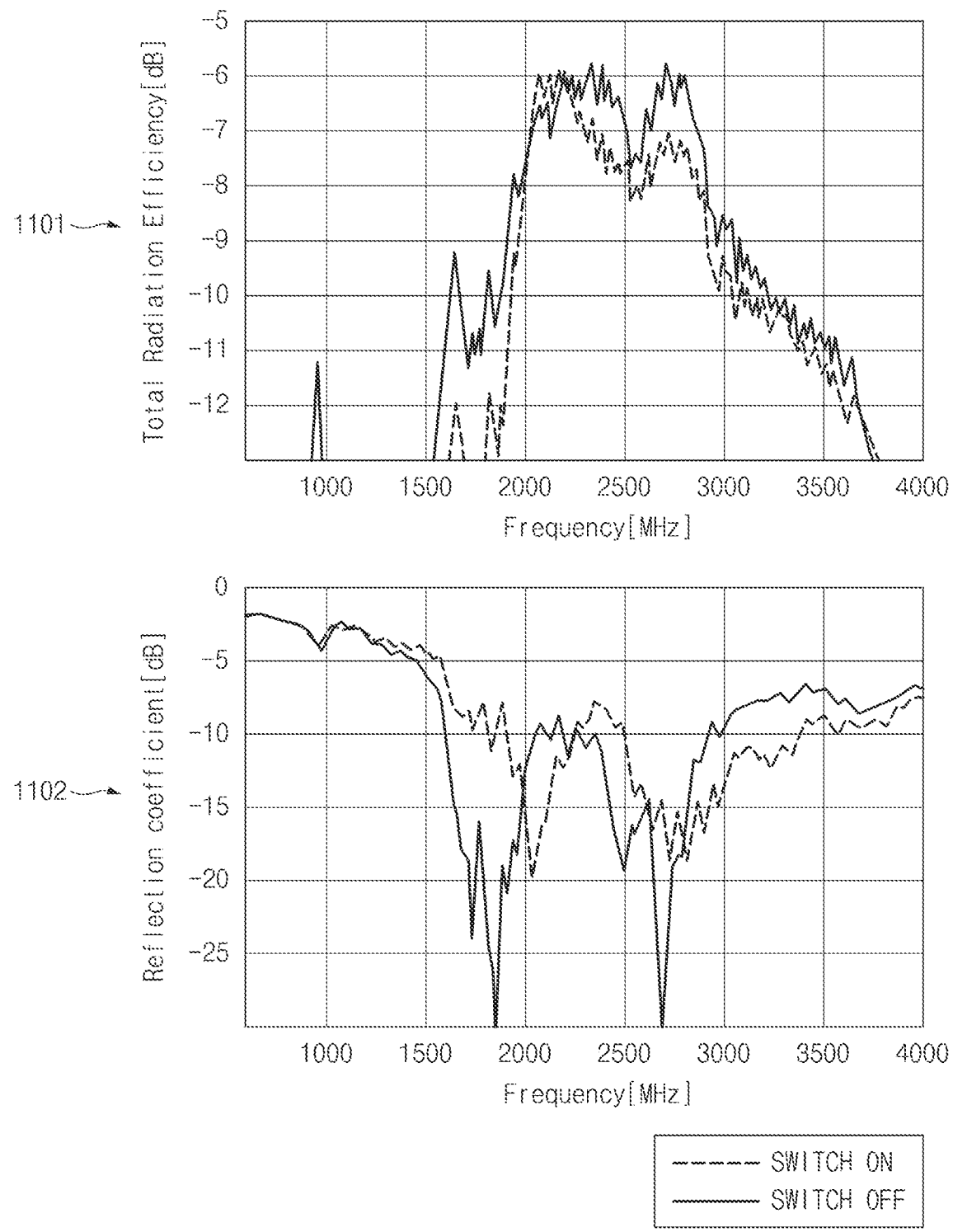
FIG. 11 illustrates a graph for radiation efficiency of a signal processing circuit including a plurality of radiators and a graph for a reflection coefficient of the signal processing circuit, according to an embodiment.

FIG. 11 illustrates a graph 1101 for radiation efficiency of a signal processing circuit including a plurality of radiators and a graph 1102 for a reflection coefficient of the signal processing circuit, according to an embodiment.

Graph 1101 illustrates total radiation efficiency (dB) in relation to frequency (MHz). Similar to graph 901 of FIG. 9, the radiation efficiency is improved in some bands when a signal processing circuit operates while a switch is turned off.

Graph 1102 illustrates a reflection coefficient (dB) in relation to frequency (MHz). In graph 1102, it is identified that resonant frequencies in two bands are shifted to lower bands.

Figure 12:
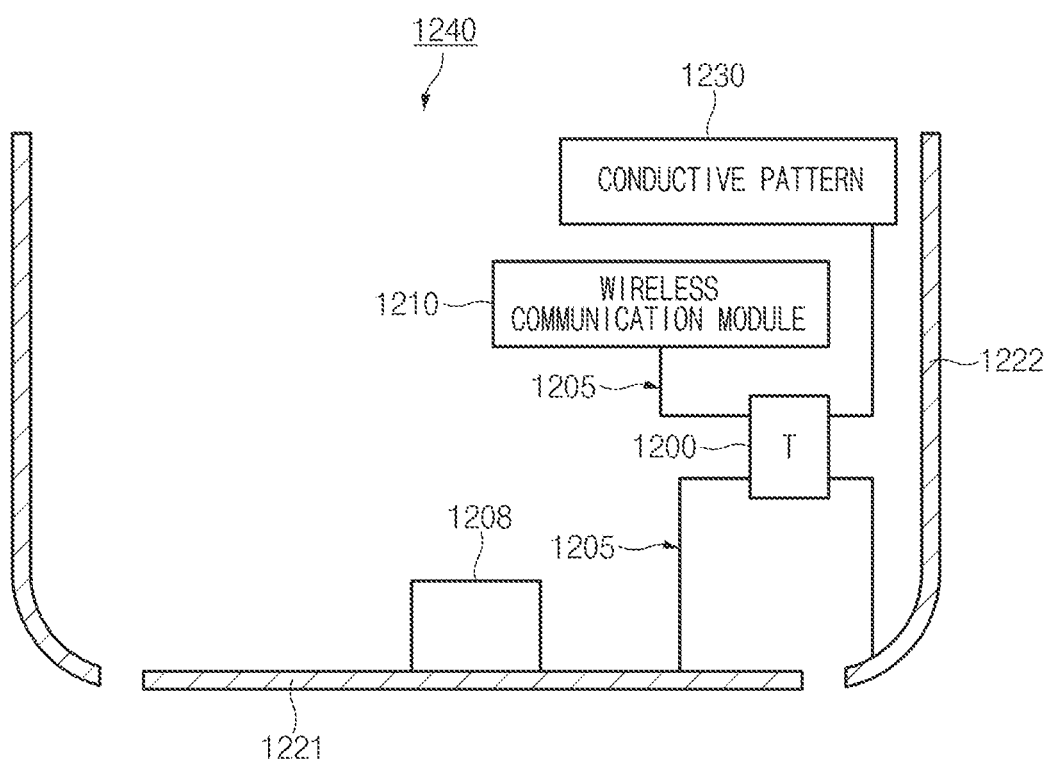
FIG. 12 illustrates a partial configuration of an electronic device having a tuner, according to an embodiment.

FIG. 12 illustrates a partial configuration 1240 of an electronic device having a tuner, according to an embodiment. When an electronic device includes a housing formed of a metal material, the electronic device may use the metal housing as a radiator. For example, the housing may include a first conductive portion 1221 or a second conductive portion 1222, which are capable of being used as a radiator.

The electronic device may include a tuner (T) 1200 that selects a signal of a frequency while being tuned to the frequency of the signal. The tuner may be connected to at least one of the first conductive portion 1221 or the second conductive portion 1222 that is used as a radiator. As another example, the tuner may include a variable capacitor connected to at least one of the first conductive portion 1221 or the second conductive portion 1222.

The electronic device may further include a wireless communication module 1210 for transmitting or receiving a signal with at least one of the first conductive portion 1221 or the second conductive portion 1222 that is used as a radiator. The wireless communication module 1210 may be connected to at least one of the first conductive portion 1221 or the second conductive portion 1222 through a feed line 1205. In FIG. 12, the feed line 1205 may be formed through the tuner 1200. However, the wireless communication module 1210 may be connected to the first conductive portion 1221 or the second conductive portion 1222 through a feed line that does not pass through the tuner 1200.

The electronic device may further include a conductive pattern 1230 connected to a ground part through the tuner 1200. The conductive pattern 1230 may be provided to prevent radiation characteristics from deteriorating due to an electrical component 1208 (e.g., a USB connector, 3.5 pie connector, or c-type connector) of the electronic device adjacent to the first conductive portion 1221 or the second conductive portion 1222. For example, the conductive pattern 1230 may include a dummy laser direct structuring (LDS) antenna.

Referring to FIG. 12, when a variable capacitor connected to a radiator (e.g., the first conductive portion 1221 or the second conductive portion 1222) is provided as a component included in the tuner 1200, the maximum capacitance of the variable capacitor provided by the tuner 1200 may be fixed, and thus it may be difficult to obtain a capacitance value that exceeds a predetermined value.

Figure 13:
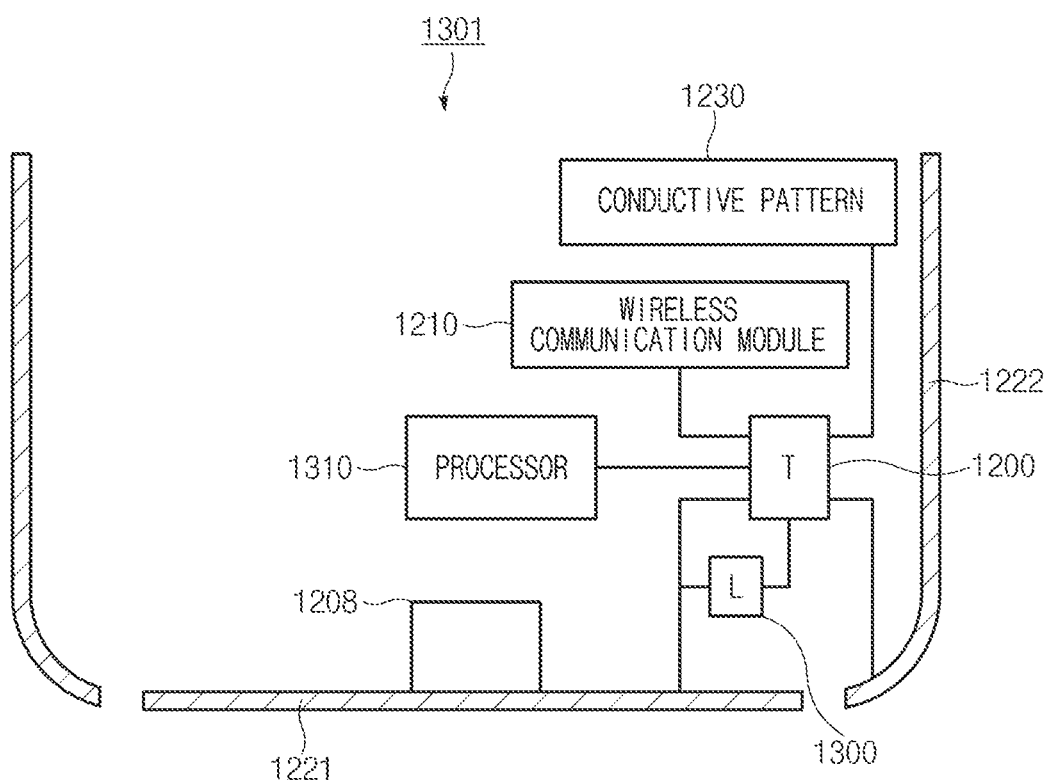
FIG. 13 illustrates a partial configuration of an electronic device including a reactance element, according to an embodiment.

However, FIG. 13 illustrates a partial configuration of an electronic device including a reactance element, according to an embodiment.

As shown in FIG. 13, the capacitance value of the variable capacitor provided by the tuner 1200 may be amplified by adding the reactance element 1300 to the outside of the tuner 1200.

In FIG. 13, an electronic device may include a processor 1310 (e.g., the processor 420 of FIG. 4). For example, the processor 1310 may include an AP or a CP of the electronic device. The processor 1310 may control a switch of a signal processing circuit 1301. For example, the processor 1310 may be electrically connected to a switch of the signal processing circuit 1301 and may deliver an electrical control signal to the switch.

The processor 1310 may control the switch (e.g., the first switch 503 of FIG. 5 or the first switch 1003 of FIG. 10) such that the reactance element 1300 is connected in series with a variable capacitor (e.g., the variable capacitor 501 in FIG. 5 or the variable capacitor 1001 in FIG. 10) when a specified event occurs. For example, the processor 1310 may control the switch such that the switch is opened when the specified event occurs.

Figure 14:
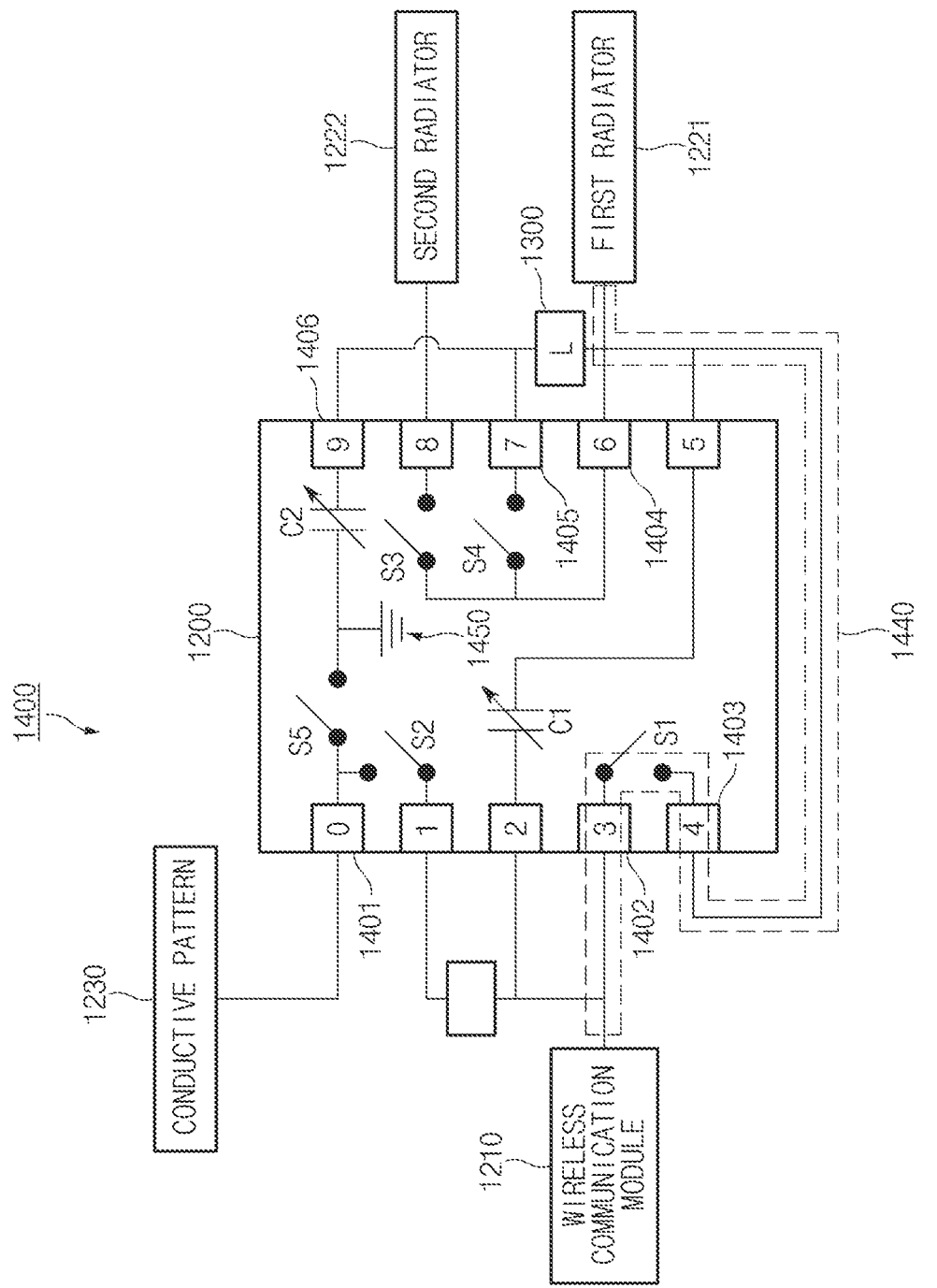
FIG. 14 illustrates a connection relationship between a tuner and other components of a signal processing circuit, according to an embodiment.

The specified event may be when an object approaches or contacts an electronic device including a signal processing circuit. For example, the switch may be opened when a user grips the electronic device or when the user's head is located close to the electronic device. The processor 1310 may recognize that a specified event occurs, by using a sensor module. The processor 1310 may determine state information based on an electrical signal received from a sensor, and then may determine whether a specified event has occurred, depending on the state information, FIG. 14 illustrates a connection relationship between the tuner 1200 and other components of a signal processing circuit 1400, according to an embodiment. Referring to FIG. 14, the tuner 1200 may include a first variable capacitor C1, a second variable capacitor C2, a second switch S1, a third switch S2, a fourth switch S3, a first switch S4, and/or a dummy switch S5. However, the configuration of the tuner 1200 shown in FIG. 14 is associated with an embodiment, and the configuration of the tuner may be changed depending on an embodiment.

The signal processing circuit 1400 or an electronic device including the signal processing circuit 1400 may include the wireless communication module 1210 connected to the tuner 1200, a first radiator 1221, a second radiator 1222, and the conductive pattern 1230.

The tuner 1200 may include a first node 1401, a second node 1402, a third node 1403, and/or a fourth node 1404. The tuner may include the dummy switch S5 connected between the first node 1401 and a ground part 1450, The first node 1401 may be connected to the conductive pattern 1230 outside the tuner 1200.

The tuner 1200 may include the second switch S1 connecting between the second node 1402 and the third node 1403. The wireless communication module 1210 outside the tuner 1200 may be connected to the second node 1402, and the first radiator 1221 may be connected to the third node 1403, Accordingly, a feed path 1440 through which the wireless communication module 1210 is connected to the first radiator 1221 via the second switch S1 may be formed.

The tuner 1200 may include the first switch S4 connected between the fourth node 1404 and a fifth node 1405. As another example, the tuner 1200 may include the second variable capacitor C2 connected between a sixth node 1406 and the ground part 1450, The reactance element 1300 may be connected between the first radiator 1221 and the sixth node 1406. As another example, opposite ends of the reactance element 1300 may be further connected to the fourth node 1404 and the fifth node 1405, respectively. The opposite ends of the reactance element 1300 are connected to each other when the first switch S4 is turned on, and thus a circuit may operate without the influence of the reactance element 1300, When the first switch S4 is turned off, the reactance element 1300 and the second variable capacitor C2 may be connected in series to each other between the teed path 1440 and the ground part 1450. For example, the first switch S4 may perform a function of the first switch 503 of FIG. 5 or the first switch 1003 of FIG. 10.

Figure 15:
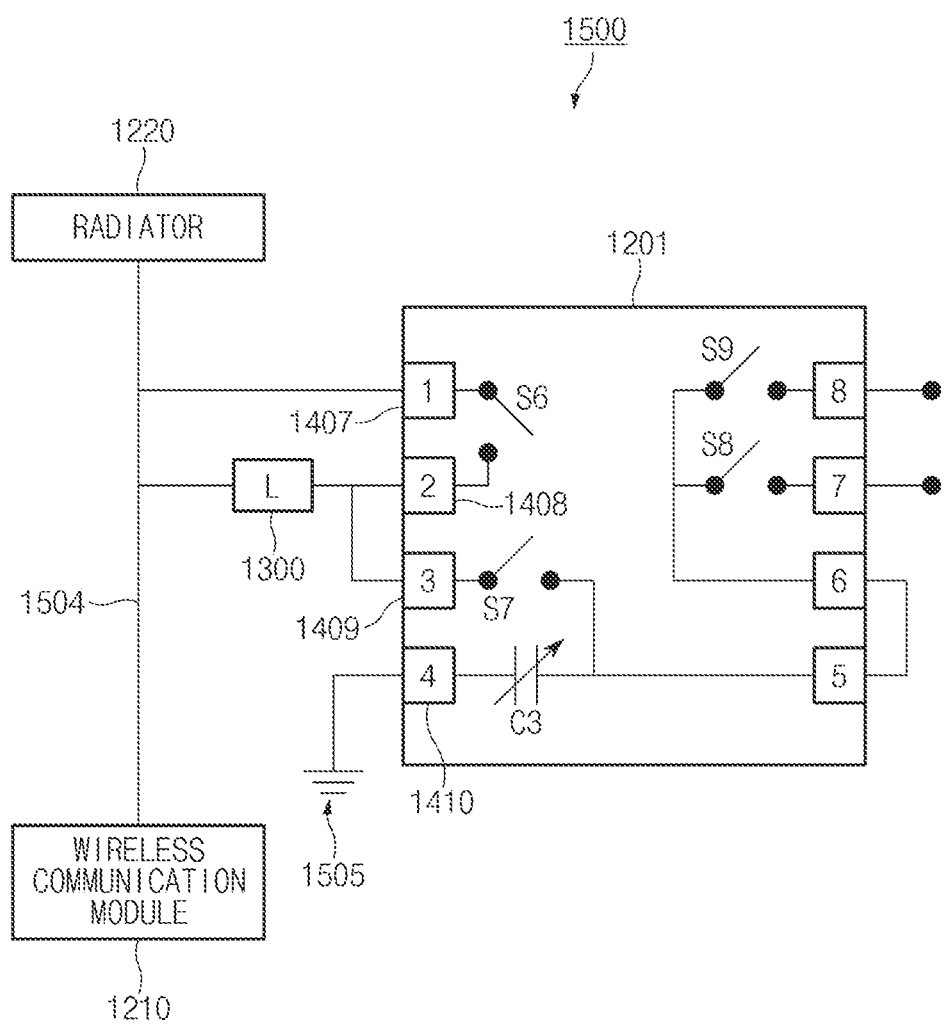
FIG. 15 illustrates a connection relationship between a tuner and other components of a signal processing circuit, according to an embodiment.

The second radiator 1222 may be further connected to the tuner 1200. FIG. 15 illustrates a connection relationship between a tuner 1201 and other components of a signal processing circuit 1500, according to an embodiment. FIG. 15 is associated with when a feed line 1504 connected from the wireless communication module 1210 to a radiator 1220 is arranged in a direction in which one or more of seventh to tenth nodes 1407 to 1410 of the tuner 1201 are located.

The tuner 1201 may include a third variable capacitor C3, a fifth switch S6, a sixth switch S7, a seventh switch S8, and/or an eighth switch S9. However, the configuration of the tuner 1201 shown in FIG. 15 may be changed depending on an embodiment.

Referring to FIG. 15, the seventh node 1407 may be connected to the feed line 1504 that delivers a signal from the wireless communication module 1210 to the radiator 1220. As another example, the tuner 1201 may include the fifth switch S6 connecting between the seventh node 1407 and the eighth node 1408.

The eighth node 1408 and the ninth node 1409 of the tuner 1201 may be connected to the other side of the reactance element 1300, of which one side is connected to the teed line 1504. The tuner 1201 may further include the sixth switch S7 connected between the ninth node 1409 and the third variable capacitor C3 of the tuner 1201. Each of the fifth switch S6 and the sixth switch S7 may perform the same function as the first switch 503 of FIG. 5 or the first switch 1003 of FIG. 10. For example, when both the fifth switch S6 and the sixth switch S7 are turned on, the signal processing circuit 1500 may operate based on the capacitance of the third variable capacitor C3 without the influence of the reactance element 1300. As another example, when the fifth switch S6 is turned off and the sixth switch S7 is turned on, the capacitance of the third variable capacitor C3 may be amplified by the reactance element 1300.

Figure 16:
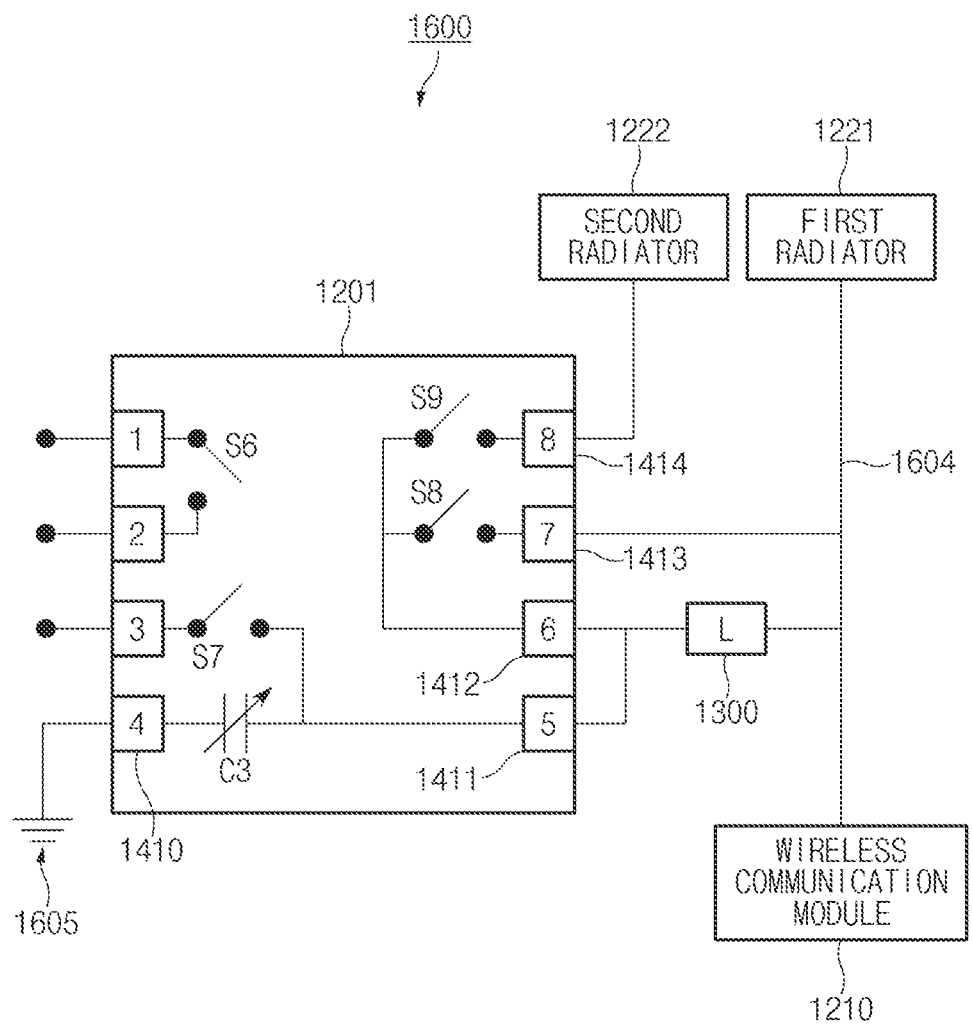
FIG. 16 illustrates a connection relationship between a tuner and other components of a signal processing circuit, according to an embodiment.

FIG. 16 illustrates a connection relationship between the tuner 1201 and other components of a signal processing circuit 1600, according to an embodiment. In particular, FIG. 16 is associated with when a feed line 1604 connected from the wireless communication module 1210 to the first radiator 1221 is arranged in a direction in which one or more of eleventh to fourteenth nodes 1411 to 1414 of the tuner 1201 are located.

The tuner 1201 may include the third variable capacitor C3, the fifth switch S6, the sixth switch S7, the seventh switch S8, and the eighth switch S9. However, the configuration of the tuner 1201 shown in FIG. 16 may be changed depending on an embodiment.

Referring to FIG. 16, the tuner 1201 may include the third variable capacitor C3 connected to a tenth node 1410. The tenth node 1410 may also be connected to a ground part 1605. The eleventh node 1411 of the tuner 1201 may be connected to one side to which the tenth node 1410 of the third variable capacitor C3 is not connected, and may be connected to the twelfth node 1412.

One side of the reactance element 1300 may be connected to the eleventh node 1411 and the twelfth node 1412. The other side of the reactance element 1300 may be connected to the feed line 1604 connected from the wireless communication module 1210 to the radiator 1221. The tuner 1201 may include the seventh switch S8 connecting the twelfth node 1412 and the thirteenth node 1413. The seventh switch S8 may perform a function of the first switch 503 of FIG. 1.

The second radiator 1222 may be further connected to the fourteenth node 1414 of the tuner 1201.

Figure 17:
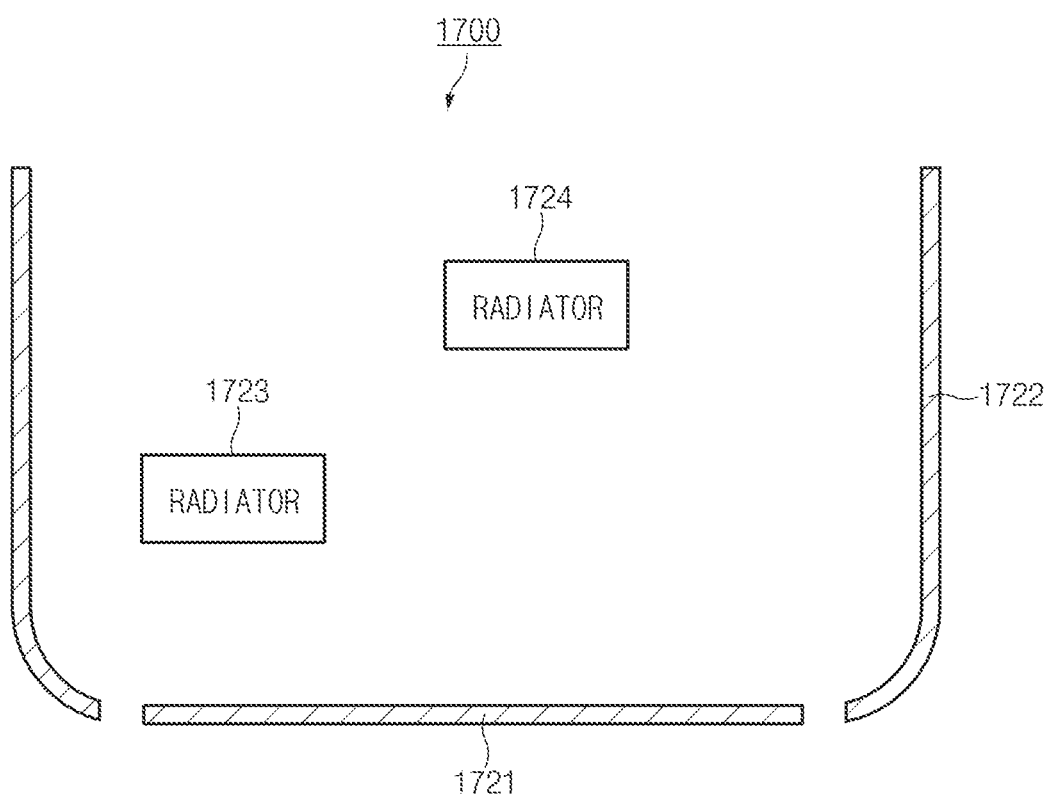
FIG. 17 illustrates an example of a plurality of radiators provided in an electronic device, according to an embodiment.

FIG. 17 illustrates an example of a plurality of radiators provided in an electronic device 1700, according to an embodiment.

The electronic device 1700 may include at least one of a first radiator 1721 formed using metal housing, a second radiator 1722 formed using metal housing, a separate third radiator 1723, and a separate fourth radiator 1724.

The first radiator 1721 may be used to transmit and receive signals in a low band (LB), a middle band (MB), and a high band. The second radiator 1722 may be used to transmit and receive signals in a middle band and a high band.

The electronic device 1700 may further include the third radiator 1723 used for a high-band signal and the fourth radiator 1724 used for a middle-band signal.

A signal processing circuit may be connected to at least one of radiators provided in the electronic device 1700.

According to an embodiment, an electronic device may include a wireless communication module, a feed line, a tuner, a reactance element, and a first switch. The wireless communication module may transmit a signal to a radiator or may receive a signal from the radiator. The feed line may deliver a signal between the wireless communication module and the radiator. The tuner may include a variable capacitor connected to the ground part. A reactance element may be connected between the variable capacitor and the feed line. The first switch may operate such that the reactance element and the variable capacitor are selectively connected to each other in series.

The electronic device may further include another radiator connected to the feed line via the tuner.

The tuner may further include a conductive pattern connected to the ground part.

The tuner may include a first switch, a dummy switch, and a second switch. The second switch may connect between a second node connected to the wireless communication module and a third node connected to the radiator. The first switch may be connected between the fourth node and the fifth node of the tuner in the tuner. Outside the tuner, one side of the reactance element may be connected to a sixth node connected to the variable capacitor and the fifth node and the other side of the reactance element is connected to the fourth node and the radiator.

The tuner may include a seventh node, an eighth node, a ninth node, and a tenth node in one side of the tuner. The first switch may include a third switch connecting between the seventh node and the eighth node and a fourth switch connecting between the ninth node and the variable capacitor.

The tuner may include a tenth node in one side of the tuner, and may include an eleventh node, a twelfth node, and a thirteenth node in the other side of the tuner. The tuner may include a first switch that connects the twelfth node and the thirteenth node. The thirteenth node may be connected to the feed line. The tuner may include a first switch that connects the twelfth node and the thirteenth node. One side of the reactance element may be connected to the eleventh node and the twelfth node, and the other side of the reactance element may be connected to the feed line.

The electronic device may include a processor. The processor may control the first switch such that the first switch is opened when a specified event occurs.

The electronic device may include a sensor that senses an internal operating state of the electronic device or an external environmental state. The processor may recognize that the event occurs, based on information about the state sensed by using the sensor. The specified event may be when the electronic device approaches or contacts an object.

According to an embodiment, a signal processing circuit may include a feed line, a variable capacitor, a reactance element (, and a first switch. The feed line may deliver a signal between the wireless communication module and the radiator. The variable capacitor and the reactance element may be connected between the feed line and a ground part and may be connected in series with each other.

The variable capacitor and the first switch may be configured to be included in a tuner for selecting an operating frequency of the radiator. Furthermore, the reactance element may be located outside the tuner.

The electronic device may further include another radiator connected to the feed line via the tuner.

The tuner may further include a conductive pattern connected to the ground part.

The tuner may include a first switch, a dummy switch, and a second switch. The second switch may connect between a second node connected to the wireless communication module and a third node connected to the radiator. The first switch may be connected between the fourth node and the fifth node of the tuner in the tuner. Outside the tuner, one side of the reactance element may be connected to a sixth node connected to the variable capacitor and the fifth node and the other side of the reactance element is connected to the fourth node and the radiator.

The tuner may include a seventh node, an eighth node, a ninth node, and a tenth node in one side of the tuner. The first switch may include a third switch connecting between the seventh node and the eighth node and a fourth switch connecting between the ninth node and the variable capacitor.

The tuner may include a tenth node in one side of the tuner, and may include an eleventh node, a twelfth node, and a thirteenth node in the other side of the tuner. The tuner may include a first switch that connects the twelfth node and the thirteenth node. The thirteenth node may be connected to the feed line. The tuner may include a first switch that connects the twelfth node and the thirteenth node. One side of the reactance element may be connected to the eleventh node and the twelfth node, and the other side of the reactance element may be connected to the feed line.

The first switch may be connected to a processor that controls the first switch. The processor may be configured to open the first switch when a specified event occurs.

The processor may control the first switch such that the first switch is opened when a specified event occurs. The processor may recognize that the event occurs, based on information about the state sensed by using the sensor. The specified event may be when the electronic device approaches or contacts an object.

The radiator may include at least part of metal housing of the electronic device including a signal processing circuit.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401), For example, a processor(e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium e.g., compact disc read only memory (CD-ROM)), or be distributed (e.g., downloaded or uploaded) online via an application store (e.g., Playstore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
   a wireless communication module configured to transmit or receive a signal;
   a feed line configured to deliver a signal between the wireless communication module and a first radiator;
   a tuner including a variable capacitor connected to a ground part;
   a reactance element connected between the variable capacitor and the feed line; and
   a first switch connected to opposite ends of the reactance element,
   wherein the first switch allows the reactance element and the variable capacitor to be selectively connected in series with each other.

2. The electronic device of claim 1, further comprising:
   a second radiator connected to the feed line via the tuner.

3. The electronic device of claim 1, further comprising:
   a conductive pattern connected to the ground part via the tuner.

4. The electronic device of claim 3, wherein the tuner includes:
   the first switch;
   a dummy switch connecting between a first node connected to the conductive pattern and the ground part; and
   a second switch connecting between a second node connected to the wireless communication module and a third node connected to the first radiator,
   wherein the first switch is connected between a fourth node and a fifth node of the tuner, in the tuner, and
   wherein, outside the tuner, one side of the reactance element is connected to a sixth node connected to the variable capacitor and the fifth node and another side of the reactance element is connected to the fourth node and the first radiator.

5. The electronic device of claim 1, wherein the tuner includes a seventh node, an eighth node, a ninth node, and a tenth node in one side of the tuner,
   wherein the seventh node is connected to the feed line,
   wherein the eighth node and the ninth node are connected to one side of the reactance element,
   wherein the tenth node is externally connected to the ground part, and is internally connected to the variable capacitor, and wherein the first switch includes:
a third switch connected between the seventh node and the eighth node; and
a fourth switch connected between the ninth node and the variable capacitor.

6. The electronic device of claim 1, wherein the tuner includes a tenth node in one side of the tuner, and includes an eleventh node, a twelfth node, and a thirteenth node in another side of the tuner,
wherein the tenth node is externally connected to the ground part, and is internally connected to one side of the variable capacitor,
wherein the eleventh node is externally connected to the twelfth node, and is internally connected to another side of the variable capacitor,
wherein the thirteenth node is connected to the feed line,
wherein the tuner includes the first switch connecting the twelfth node and the thirteenth node, and
wherein one side of the reactance element is connected to the eleventh node and the twelfth node, and another side of the reactance element is connected to the feed line.

7. The electronic device of claim 1, further comprising:
a processor,
wherein the processor is configured to open the first switch when a specified event occurs.

8. The electronic device of claim 1, further comprising:
a sensor configured to sense an internal operating state of the electronic device or an external environmental state,
wherein the processor recognizes that the event occurs, based on information about the state sensed by using the sensor.

9. The electronic device of claim 1, wherein the specified event is when an object approaches or contacts the electronic device.

10. A signal processing circuit, comprising:
a feed line configured to deliver a signal between a wireless communication module and a first radiator;
a variable capacitor and a reactance element that are connected between the feed line and a ground part and are connected in series with each other; and
a first switch connected to opposite ends of the reactance element.

11. The signal processing circuit of claim 10,
wherein the variable capacitor and the first switch are configured to be included in a tuner for selecting an operating frequency of the first radiator, and
wherein the reactance element is located outside the tuner.

12. The signal processing circuit of claim 11, further comprising:
a second radiator connected to the feed line via the tuner.

13. The signal processing circuit of claim 11, further comprising:
a conductive pattern connected to the ground part via the tuner.

14. The signal processing circuit of claim 13, wherein the tuner includes:
the first switch;
a dummy switch connected between a first node connected to the conductive pattern and the ground part; and
a second switch connected between a second node connected to the wireless communication module and a third node connected to the first radiator,
wherein the first switch is connected between a fourth node and a fifth node of the tuner, in the tuner, and
wherein, outside the tuner, one side of the reactance element is connected to a sixth node connected to the variable capacitor and the fifth node and the other side of the reactance element is connected to the fourth node and the first radiator.

15. The signal processing circuit of claim 11, wherein the tuner includes:
a seventh node, an eighth node, a ninth node, and a tenth node in one side of the tuner,
wherein the seventh node is connected to the feed line,
wherein the eighth node and the ninth node are connected to one side of the reactance element,
wherein the tenth node is externally connected to the ground part, and is internally connected to the variable capacitor, and
wherein the first switch includes:
a third switch connected between the seventh node and the eighth node; and
a fourth switch connected between the ninth node and the variable capacitor.

* * * * *

UNITED STATES PATENT AND TRADEMARK OFFICE
CERTIFICATE OF CORRECTION

PATENT NO. : 11,888,508 B2
APPLICATION NO. : 17/432367
DATED : January 30, 2024
INVENTOR(S) : Himchan Yun et al.

It is certified that error appears in the above-identified patent and that said Letters Patent is hereby corrected as shown below:

On the Title Page

Item (73):
"(73) Assignee: Electronics Co., Ltd"
Should be:
-- (73) Assignee: Samsung Electronics Co., Ltd. --

Signed and Sealed this
Fourth Day of June, 2024

Katherine Kelly Vidal
*Director of the United States Patent and Trademark Office*